United States Patent [19]
Hofmann

[11] Patent Number: 5,260,938
[45] Date of Patent: Nov. 9, 1993

[54] SWITCHING SYSTEM COMPRISING A CONFERENCE ARRANGEMENT

[75] Inventor: Rudolf Hofmann, Forchheim, Fed. Rep. of Germany

[73] Assignee: U.S. Philips Corporation, New York, N.Y.

[21] Appl. No.: 703,545

[22] Filed: May 21, 1991

[30] Foreign Application Priority Data

May 26, 1990 [DE] Fed. Rep. of Germany ....... 4017027

[51] Int. Cl.$^5$ .................. H04L 12/18; H04M 3/56
[52] U.S. Cl. ..................... 370/62; 370/79; 370/80; 379/158; 379/202
[58] Field of Search ............ 370/62, 79, 80; 379/158, 202

[56] References Cited

U.S. PATENT DOCUMENTS

| | | | |
|---|---|---|---|
| 4,591,827 | 5/1986 | Nishita et al. | 370/62 X |
| 4,607,362 | 8/1986 | Vary et al. | 370/62 |
| 4,658,398 | 4/1987 | Hsing | 370/62 |

Primary Examiner—Douglas W. Olms
Assistant Examiner—Russell W. Blum
Attorney, Agent, or Firm—David R. Treacy

[57] ABSTRACT

A telephone switching system, or teleconferencing arrangement, in which each participant hears all the other speakers but does not hear his own voice. The speech intensity of each participant is measured and subtracted from a signal which is based on the sum of all the other participants then speaking. This difference signal is then compared with a threshold to determine if this participant is rated "speaking" (signal to be added for others to hear) or "listening". The speech intensity signal is multiplied by a weighing factor based on this comparison, before adding to the other weighted signals to form the sum signal.

19 Claims, 3 Drawing Sheets

SWITCHING SYSTEM COMPRISING A CONFERENCE ARRANGEMENT

BACKGROUND OF THE INVENTION

The invention relates to a conference switching system, and more specifically, a PCM switching system, in which a sum signal is formed for each participant in the conference from speech samples of the relevant participant, and a speech intensity is determined for each participant on the basis of which each share of the speech sample in the sum signal is determined.

DE-PS 33 29 779 to which U.S. Pat. No. 4,607,362 corresponds, discloses a method of establishing conference connections in a PCM private branch exchange, in which in a conference arrangement during a pulse frame the compressed codewords received from participants are linearized and buffered and in which, prior to transmission to the participant, during a next pulse frame a final sum codeword is formed and delineatized to the compressed codeword. Meanwhile, during the pulse frame, the speech intensities of the individual participants are measured and the weighting factors are adapted in dependence on these speech intensities.

For this purpose, the speech samples of each participant in the conference are applied to a measuring arrangement which measures the speech intensities of the individual participants. A participant whose measured speech intensity exceeds a predeterminable threshold is graded as actively speaking. This predeterminable threshold for each participant may be individually adapted in accordance with each participant's speech intensity measured during his previous conversation.

Many participants do not always feel the acoustic impression of reproduction according to that method to be "natural".

SUMMARY OF THE INVENTION

It is an object of the present invention to provide a switching system of the type defined in the opening paragraph in which in an extremely simple manner the current speech situation is taken more into consideration when the speech conditions are determined.

This object is achieved in that a speech intensity is determined for the sum signal also. To determine the share of the speech sample of a conference participant in the sum signal, his speech intensity is compared with the speech intensity determined for the sum signal.

With this manner of determining the conditions of speech, it is not the absolute intensity of a single conference participant that is concentrated on, but a comparison to the speech intensities of all the individual participants that are included in the signal evaluation. This leads to the fact that in a situation of an altogether moderate loudness call a low loudness level is sufficient for a participant to get through. In a situation of a heated, i.e. loud, conversation a louder speech signal is necessary for an "intervention" in the conversation. This is felt to be proper and therefore natural by most participants.

A very simple embodiment for the conference arrangement is provided in that a differential value is formed from the speech sample of each one of the participants in the conference and the outgoing sum signal, and in that this differential value is compared with a threshold value. Especially when, for considering the previous course of the speech intensities of both the relevant participant and the relevant partial sum signal (that is, the sum signal for all participants except this particular participant), a low-pass filtering of the differential value is effected, the circuit complexity for determining the speech conditions may be reduced, because the level of the partial sum signal need not be computed separately. In this manner two multiplications and one addition can be saved for each computation of the low-pass filtering.

Furthermore, the circuit complexity and cost may be reduced in that for all the participants only a single arrangement need be used for the formation of the differential value and for the comparison with the threshold value. This arrangement is operated in a time-division multiplex mode.

In such an embodiment of the invention it is especially advantageous to arrange the PCM words of the speech samples of the individual participants not directly successively in a PCM frame. What is more, the arrangement of the participants' speech samples in the PCM frame had rather be selected such that the samples succeed each other with specific time gaps.

The time gaps between the speech samples which belong together to all the participants are selected in such a way that they correspond at least to the processing time (sum formation, determination of the speech condition etc.). In this manner also a relatively slow arrangement for conferencing can be enabled to operate in the time-division multiplex mode.

DESCRIPTION OF THE PREFERRED EMBODIMENT

Figure 1:
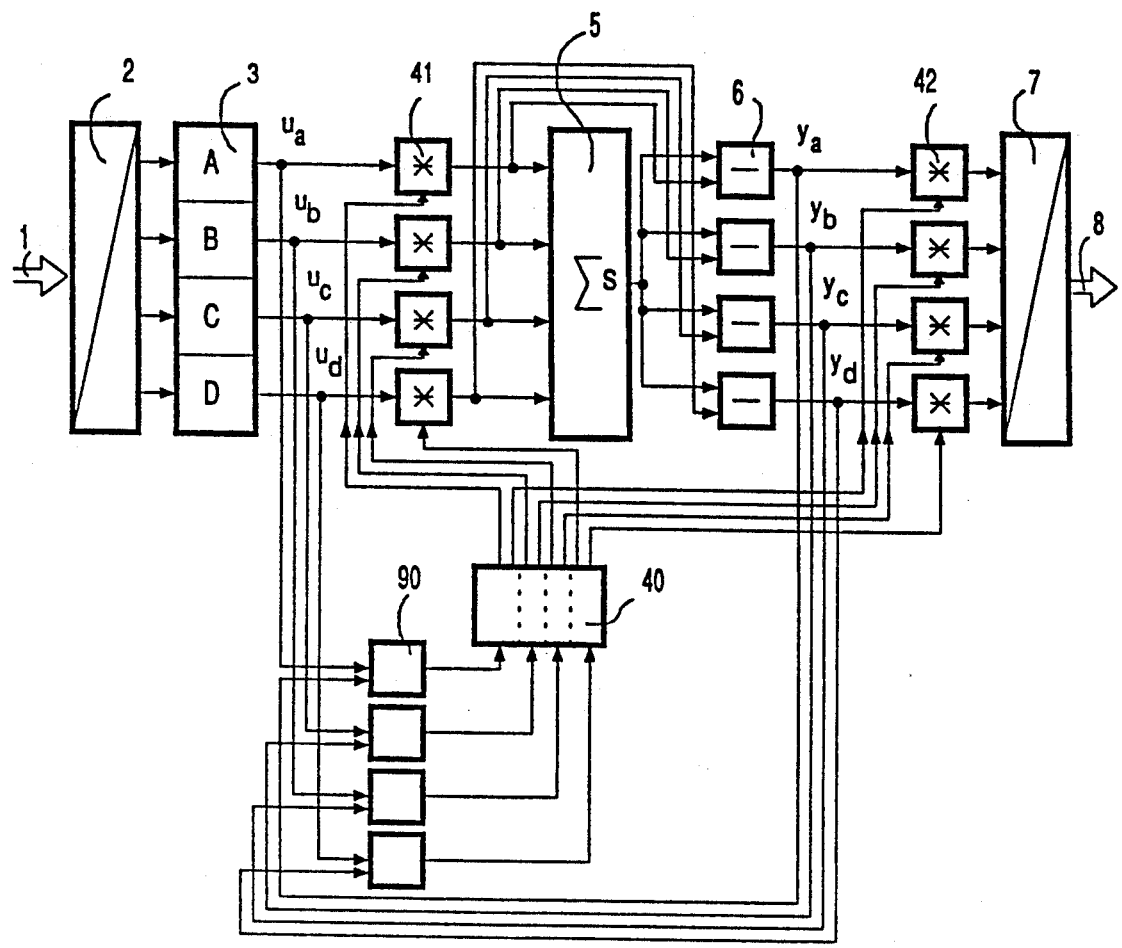
FIG. 1 gives in a block diagram a representation of a conference arrangement with speech sample evaluation by means of level comparison.

FIG. 1 gives in a block diagram a representation of a switching system comprising a conference arrangement with four participants. Needless to say, in addition to such a discrete structure it is also possible to utilize such a conference arrangement by means of a signal processor. The functions of the individual blocks of the block diagram may then be copied with the necessary changes having been made by accordingly programming the signal processor.

The switching system represented in the embodiment is a switching system in which the speech signals of the individual participants in a conference are applied to a code converter 2 as PCM encoded speech samples over a PCM bus 1. The code converter 2 converts the PCM values arriving in series into linear speech samples Ay B, C, D, while each speech sample is represented by a binary data word 13 bits in length. The speech samples of each participant are buffered in a buffer 3 until the next speech sample of the respective participant arrives.

Each speech sample A, B, C, D is applied to an analog adder 5 through respective multipliers 41. The analog adder 5 forms a sum codeword (sum signal) from all the speech samples that may have been attenuated by the first multipliers 41. The sum codeword is not to be applied directly to a participant, so that he will not hear himself (echo in case of long delays). By means of a subtraction circuit 6 provided for each participant, the sum codeword S is reduced by each participant's own portion of the speech sample. The codeword thus obtained for each participant is denoted partial sum codeword y (generally, partial sum signal).

For forming the partial sum codewords, each first input of the subtraction circuits 6 is connected to an output of one of the first multipliers 41. Each second input of the subtraction circuits 6 is supplied with the sum codeword of analog adder 5. The outputs of the subtraction circuits 6 are connected to the first inputs of second multipliers 42. By means of these second multipliers 42 the partial sum codewords applied thereto may be attenuated as required. The outputs of these second multipliers 42 are connected to a second code converter 7 which converts the partial sum codewords to be applied to the participants into corresponding delineatized PCM values and inserts them again at the appropriate positions in the PCM frames and applies them to the participants over a second bus 8.

The adjustment of the weighting factors for the multipliers 41, 42 is effected in the weighting circuit 40 in dependence on the fact whether a participant is graded as "speaking" or "listening". This distinction is made in a level comparator 90 in which the level of the unweighted arriving speech signal of a participant is compared with that of the unweighted departing partial sum signal of the same participant. If the level of the arriving signal is on average higher than the level of the departing signal, the participant is graded as "speaking".

The weighting unit 40 controls the multipliers 41 so that the arriving signals from participants who are graded as "listening" are attenuated. In this fashion rest signals or disturbing noise signals are not fully included in the summation. On the other hand, signals from participants graded as "speaking" are not attenuated by the weighting unit 40. Furthermore, when accordingly selecting the weighting factors for the multipliers 41, it may be ensured that the adder 5 or subtractors 6 will not overflow.

If adder 5 and subtractors 6 are arranged for an enlarged range of digits (for example, 16-bit adder for 13-bit input data words), these second multipliers 42 may be used for leading partial sum signals which go beyond the scale of the next code converter 7 to within the permissible range limiting function) by attenuating them.

The weighting unit 40 controls the second multipliers 42 in such a way that the departing partial sum signals of the participants who are graded as "listening" are weighted with the factor of one. Thus the speech samples of silent participants pass unattenuated through this part of the conference arrangement.

Partial sum signals of the participants graded as "speaking" are attenuated by the multipliers 42. The adjustment of the weighting factors for the multipliers 41, 42 is performed in mutual dependence so that the product of the two factors does not exceed a predetermined threshold. In a highly advantageous manner the attenuation factors may then be selected in dependence on the number of participants. This avoids the problem that, when hybrid circuits are used in the transmission line, disturbing noise is fed back to the conference and thus causes instabilities to occur.

During the evaluation of the speech intensity of a speech sample of a single participant it is to be avoided that briefly occurring high numerical values of the speech sample lead to the fact that the participant is classified as a speaking participant. In that case, brief noise signals would immediately be included in the sum codeword and deteriorate the mutual audibility of the participants. In the embodiment of the invention the level comparators 90 are therefore arranged in such a way that also the speech intensities of a participant's speech samples preceding the speech sample to be weighted are accordingly taken into account.

Figure 2:
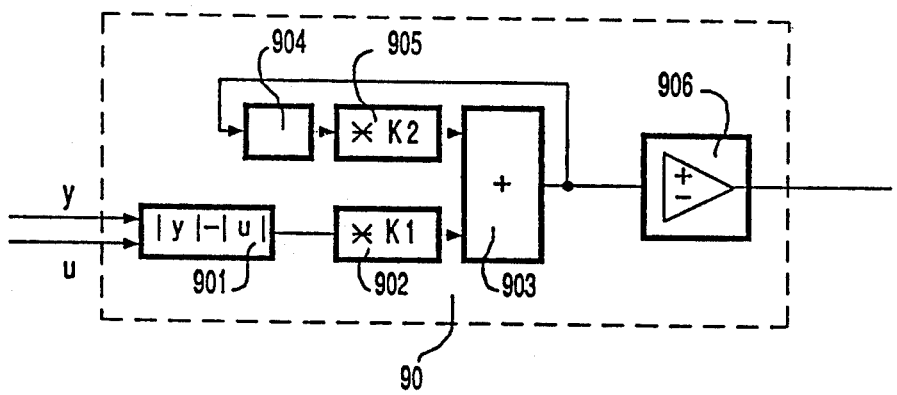
FIG. 2 shows the structure of a level comparator.

FIG. 2 shows the structure of a single level comparator 90. Each speech sample u applied to the level comparator 90 and the partial sum signal y are applied to a value subtractor 901 in the level comparator unit 90.

The value subtractor 901 forms the value $|y|$ from the partial sum signal y applied to its first input and subtracts therefrom the value of the speech sample $|u|$ of the participant to be classified. The difference $|y| - |u|$ is multiplied by a first coefficient K1 in a first multiplier 902 and applied to a first input of an adder 903. The output signal of a buffer 904 is applied to the second input of the adder 903 through a second multiplier 905. In the second multiplier 905 the content of the buffer 904 is multiplicatively combined with a second coefficient K2. The output signal of the adder 903 is fed back to the input of the buffer 904. The coefficients K1 and K2 are selected in such a way that the two are smaller than the binary value of one and that the coefficient K1 is equal to the difference between the binary value of one and the coefficient K2. In the embodiment the value of 0.875 was selected for K1 and 0.125 for K2.

The selection of the coefficients K1 and K2 and the described signal processing in which the most recently computed value is buffered provides a weighting which depends on the past of the signal. In essence, this signal processing corresponds to a low-pass or an integrator function.

The output signal of the adder 903 is furthermore applied to a threshold switch 906. With output values smaller than or equal to zero of the adder 903 the participant to be weighted is graded as actively speaking.

When the decision threshold is determined to have the value of zero, satisfactory results can be obtained. In order to achieve the same effects as mentioned in the document described hereinbefore, in which, for example, also the conversation held thus far of a single participant can be taken into account, also in this case the decision threshold may be formed by means of further weighting and control circuits which permit a variable structure.

For an enhancement of a weighting factor the weighting factor is increased by a specific value from one PCM frame to the next or after a specific number of PCM frames, which value is further denoted as increment value. This procedure is performed until the weighting factor thus reaches a specific top limit value predetermined by the weighting control circuit 40. For a reduction of a weighting factor to a specific predetermined bottom limit value, the weighting factor is reduced by subtracting a specific second binary value which will be denoted as decrement value in each corresponding PCM frame. The decrement value is then selected such that it exceeds the increment value. In this fashion the number of PCM frames in which a weighting factor is reduced from a top value to a bottom value is smaller than the number of PCM frames in which a weighting factor is increased from its bottom value to a top value. Since the grading of a participant silent thus far as an actively speaking participant from then on is mostly accompanied by the grading of a participant actively speaking thus far and silent from then on, it is achieved in this manner, which is relatively easy to rearise, that the overall attenuation during the variable adaptation of the speech samples is increased to slightly above the overall attenuation before or after the variable adaptation if need be. This avoids instabilities when the overall attenuation is too small.

Figure 5A:
FIGS. 5a and 5b show the courses the course of the weighting factor G for a participant in a conference.
Figure 5B:
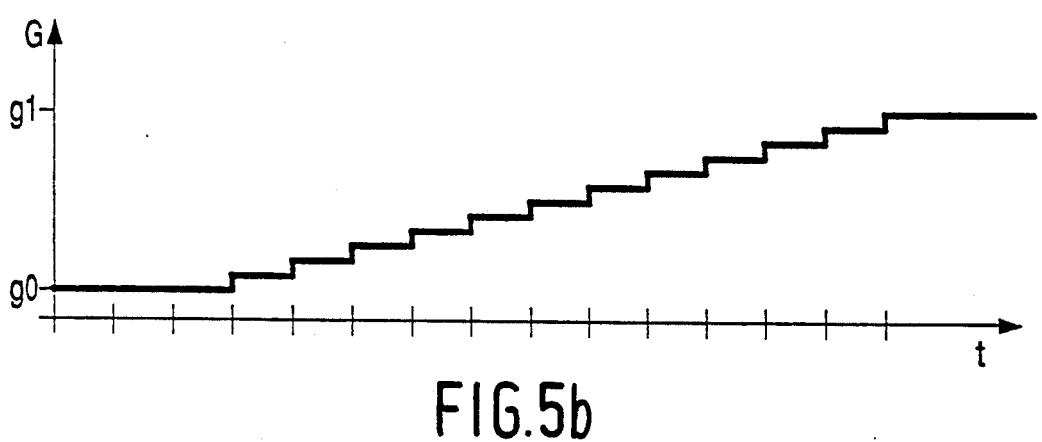

The diagram shown in FIG. 5 All resents the course of the weighting factor G for a participant in a conference, whose weighting factor is reduced from a top limit value g1, to a bottom limit value. The step-by-step gradation of the weighting factor from one PCM frame to the next is clearly noticeable. The diagram of FIG. 5b, represents the augmentation of a weighting factor G. The rather long period of time necessary for the weighting factor G to go from its bottom limit value g0 to its top limit value g1 due to its smaller increment value is distinctly shown.

Favourable results can be obtained with increment values which are about $\frac{1}{2}$ to $\frac{1}{4}$ of the decrement value. In one embodiment, in which 8000 speech samples per participant are processed per second, for example, 1.0 is chosen as a decimal factor for the top limit value having 0 dB attenuation and 0.1778 as a decimal factor for the bottom limit value having 15 dB attenuation. If the decimal value of 0.0003 is selected as the increment value, the transition from the bottom limit value to the top limit value will be terminated after about 350 ms if incrementing takes place after each speech sample. If double the increment value is selected for the decrement value, the transition from the top limit value to the bottom limit value will be terminated after about 175 ms.

In conference circuits having a plurality of participants it is quite possible that at different instants a start is made with the reduction or increase of the weighting factors of the individual participants. Even when during the reduction or increase of the weighting factors reduction and increase curves intersect, overloading can nevertheless be simply avoided in the manner described above. With an unequal number of weighting factors to be incremented and decremented, the decrement values or increment values respectively, are adapted in such a way that the sum of the decrement values is larger by a specific factor (for example, two times) than the sum of the increment values.

Figure 6:
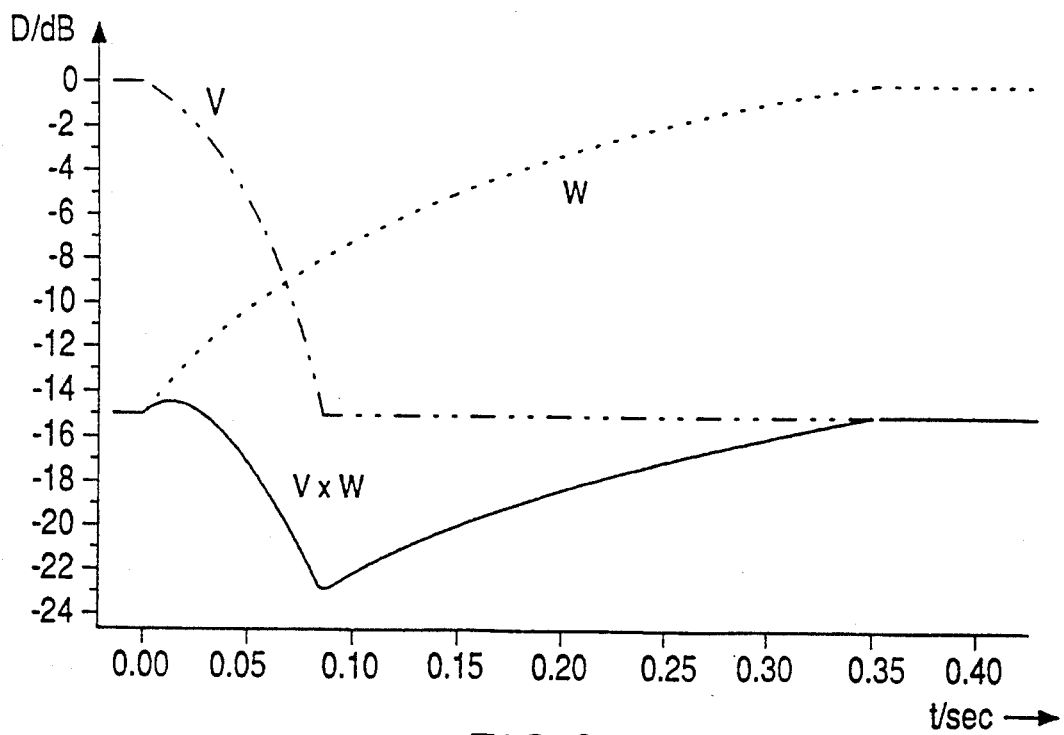
FIG. 6 the course of the attenuation values in a semi-logarithmic representation.

FIG. 6 gives the course of the attenuation values in a semi-logarithmic representation. The line V shows the attenuation curve which is obtained by driving the first multiplier 41 and W shows the attenuation curve which is obtained by means of the second multiplier 42. The overall attenuation VW exceeds only very briefly the −15 dB overall attenuation.

Figure 4:
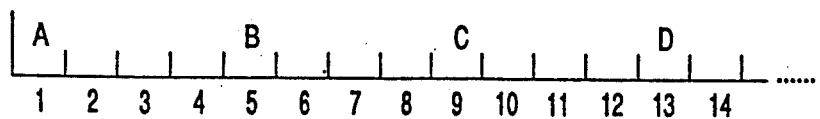
FIG. 4 shows an arrangement of speech samples within a PCM frame.

FIG. 4 shows in a diagram part of a PCM frame. The speech sample of the first participant A is inserted in a first time slot 1 of the PCM frame, the speech sample of the second participant B in a fifth time slot 5 etc. The gaps, for example, between time slot 1 and time slot 5, are filled with speech samples from other subscribers not involved in this conference circuit. For clarity the FIG. 4 does not show the speech samples from these other subscribers.

The distance in time at which the speech samples of two participants involved in a conference circuit succeed one another is suitably selected such that the weighting of a participant is terminated within this period of time. Consequently, even for weighting circuits not capable of performing a weighting operation within the period of a time slot it is not necessary to provide a level comparator 90 for each participant, but it will be sufficient, as described hereinbefore, to include a single weighting circuit for all the participants participating in a conference. The weighting of the speech samples is then always effected when a new speech sample arrives. For example, for the weighting of participant C, for the formation of the sum signal y in the time slot 9, the weighting circuit is supplied with the speech samples A, B, C of the same time slot and since the speech sample D of the same time slot has not yet arrived, is supplied with the speech sample D of the preceding time slot.

Figure 3:
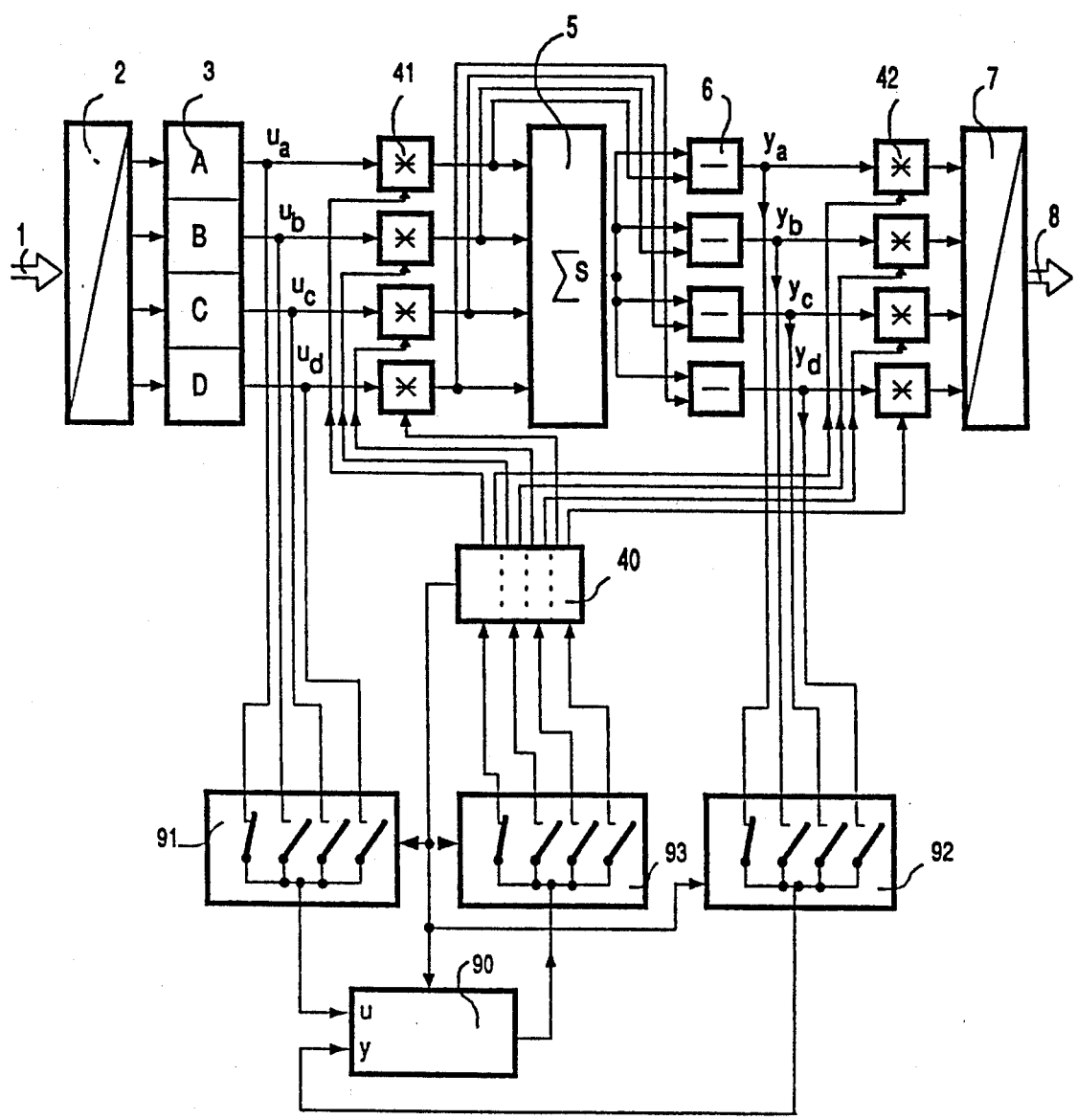
FIG. 3 gives a diagrammatic representation of a conference arrangement comprising a single level comparator.

A very simple embodiment with only a single level comparator 90 which performs the level comparison for all the participants at different instants will be illustrated in the following with respect to the embodiment represented in FIG. 3.

The speech sample u of each participant to be weighted is selected by a first multiplexer 91 and each allocated sum signal y by a second multiplexer 92 in response to control signals from the weighting circuit 40, and applied to the single level comparator 90. The output signal of the level comparator is applied to the weighting control circuit 40 through a demultiplexer 93. Since, generally speaking, for each speech sample the value stored in the buffer 904 is different, the embodiment comprises an addressable buffer.

I claim:

1. A speech signal conference system, for providing speech signals representative of discussion in a conference during which a plurality of participants may speak simultaneously, comprising means for taking speech samples from each participant, means for determining a respective speech intensity for each participant based on the respective samples, means, based on the respective determined speech intensities, for establishing a respective share of a sum signal to be accorded each participant's samples, and means for adding said shares to form said sum signal, characterized in that the system further comprises means for generating a speech intensity value based on said sum signal, and said means for establishing a respective share is responsive to a comparison of the respective speech intensity value with said speech intensity value based on said sum signal.

2. A system as claimed in claim 1, characterized in that said means for generating a speech intensity value based on said sum signal comprises a subtractor for subtracting the respective participant's share of said sum signal from said sum signal, to form a respective partial sum signal, and said means for establishing comprises means for comparing the respective speech intensity with the intensity of the respective partial sum signal.

3. A system as claimed in claim 2, characterized in that said means for comparing comprises means for determining a differential value ($|y| - |u|$) where y is said respective partial sum signal and u is said respective speech sample, and for comparing this differential value ($|y| - |u|$) with a threshold value.

4. A system as claimed in claim 3, characterized in that said means for determining a respective speech intensity takes into account the course of the respective speech intensities preceding in time.

5. A system as claimed in claim 4, characterized in that said means for determining includes a low pass filter for receiving said differential value ($|y| - |u|$) for taking into account the respective preceding speech intensities.

6. A system as claimed in claim 5, characterized in that said means for comparing the respective speech intensity with the intensity of the respective partial sum signal comprises a single said means for determining a differential value and for comparing this differential value only, said single said means being operated in a time-division multiplex mode.

7. A system as claimed in claim 4, characterized in that said means for comparing the respective speech intensity with the intensity of the respective partial sum signal comprises a single said means for determining a differential value and for comparing this differential value only, said single said means being operated in a time-division multiplex mode.

8. A system as claimed in claim 3, characterized in that said means for comparing the respective speech intensity with the intensity of the respective partial sum signal comprises a single said means for determining a differential value and for comparing this differential value only, said single said means being operated in a time-division multiplex mode.

9. A PCM speech signal conference system, for providing speech signals representative of discussion in a conference during which a plurality of participants may speak simultaneously, comprising
   means for taking speech samples from each participant,
   means for determining a respective speech intensity for each participant based on the respective speech samples,
   means for selecting intensity samples of the respective speech intensities, and, based on the selected intensity samples of the respective determined speech intensities, for establishing a respective share of a sum signal to be accorded each participant's speech samples, and
   means for adding said shares to form said sum signal, characterized in that the system further comprises means for generating a speech intensity value based on said sum signal, and
   said means for establishing a respective share is responsive to a comparison of the respective selected intensity sample with said speech intensity value based on said sum signal.

10. A system as claimed in claim 9, characterized in that said means for generating a speech intensity value based on said sum signal comprises a subtractor for subtracting the respective participant's share of said sum signal from said sum signal, to form a respective partial sum signal, and
   said means for establishing comprises means for comparing the respective selected intensity sample with the intensity of the respective partial sum signal.

11. A system as claimed in claim 10, characterized in that said means for comparing comprises means for determining a differential value ($|y| - |u|$) where y is said respective partial sum signal and u is said respective speech sample, and for comparing this differential value ($|y| - |u|$) with a threshold value.

12. A system as claimed in claim 11, characterized in that said means for determining a respective speech intensity takes into account the course of the respective speech intensities preceding in time.

13. A system as claimed in claim 12, characterized in that said means for determining includes a low pass filter for receiving said differential value ($|y| - |u|$) for taking into account the respective preceding speech intensities.

14. A system as claimed in claim 13, characterized in that said means for comparing the respective selected intensity sample with the intensity of the respective partial sum signal comprises a single said means for determining a differential value and for comparing this differential value only, said single said means being operated in a time-division multiplex mode.

15. A system as claimed in claim 14, characterized in that in a PCM frame the speech samples of the participants succeed one another at intervals lasting a specific number of time slots, and in that the respective partial sum signal for a participant is recovered from the most recently preceding speech sample of any other participant.

16. A system as claimed in claim 12, characterized in that said means for comparing the respective selected intensity sample with the intensity of the respective partial sum signal comprises a single said means for determining a differential value and for comparing this differential value only, said single said means being operated in a time-division multiplex mode.

17. A system as claimed in claim 16, characterized in that in a PCM frame the speech samples of the participants succeed one another at intervals lasting a specific number of time slots, and in that the respective partial sum signal for a participant is recovered from the most recently preceding speech sample of any other participant.

18. A system as claimed in claim 11, characterized in that said means for comparing the respective selected intensity sample with the intensity of the respective partial sum signal comprises a single said means for determining a differential value and for comparing this differential value only, said single said means being operated in a time-division multiplex mode.

19. A system as claimed in claim 18, characterized in that in a PCM frame the speech samples of the participants succeed one another at intervals lasting a specific number of time slots, and in that the respective partial sum signal for a participant is recovered from the most recently preceding speech sample of any other participant.

* * * * *